PROCESS FOR COUPLING POLYOLEFINS
Filed July 30, 1958
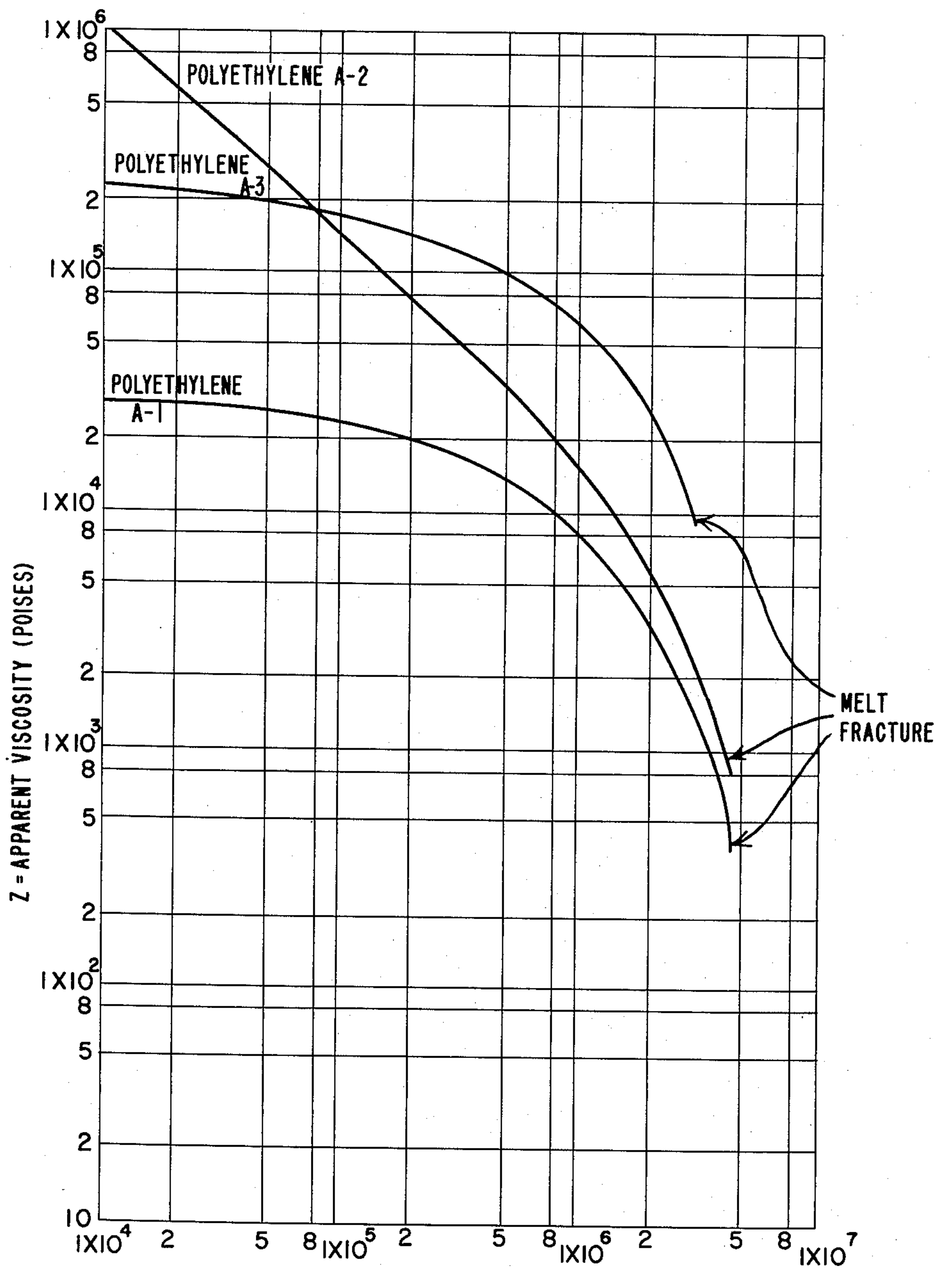
INVENTORS
CLARENCE ELMER ASHBY
SAMUEL PHILLIP FOSTER
EDWIN THOMAS PIESKI
BY
ATTORNEY United States Patent Office 2,993,882

Patented July 25, 1961

2,993,882

PROCESS FOR COUPLING POLYOLEFINS

Clarence Elmer Ashby, Samuel Phillip Foster, and Edwin Thomas Pieski, Wilmington, Del., assignors to E. I. du Pont de Nemours and Company, Wilmington, Del., a corporation of Delaware Filed July 30, 1958, Ser. No. 752,022

7 Claims. (Cl. 260—94.9)

The present invention relates to novel polyethylene and ethylene copolymer compositions, and more particularly to polyethylene and ethylene copolymers obtained by molecular coupling.

Polyethylene was first obtained as a high molecular weight polymer by an oxygen-catalyzed polymerization of ethylene at temperatures of 100 to 300° C. and pressures of 1000 to 3000 atmospheres as disclosed in U.S. 2,153,553 issued April 11, 1939 to Fawcett et al. The process and known modifications thereof, in general, give rise to a polymer having a density of about 0.91 to 0.93 and a melting point of about 110° C. to 120° C. The polymer is further characterized by solubility in hydrocarbon solvents at elevated temperatures and by significant melt flow. The polymer is partially crystalline and chemically comprises a straight chain, $(CH_2—CH_2)_n$-hydrocarbon molecule having a certain number of hydrocarbon side chains, which may have a small number of carbon atoms and are then generally referred to as short-chain branching, or which may have a large number of carbon atoms, in which case the branching is generally referred to as long-chain branching. The polymer is further characterized by a certain amount of unsaturation which may be vinyl, trans-vinylene or vinylidene in structure. More recently a novel type of polyethylene has been described in the literature and claimed in U.S. 2,816,883 issued December 17, 1957 to Larchar et al., which has a higher density, in the range of 0.95 to 0.97, and a higher melting point in the range of 126 to 136° C., a higher crystallinity and a lower degree of short-chain branching than the polyethylene prepared by the Fawcett et al. process. This type of polyethylene generally referred to as "linear polyethylene" is commercially obtained by the polymerization of ethylene with a transition metal oxide catalyst, such as described in U.S. 2,691,647 issued to Field et al. on October 12, 1954 or in U.S. 2,825,721 issued March 4, 1958 to Hogan et al., or by the polymerization of coordination catalysts comprising the reaction product of a transition metal halide, such as a titanium or vanadium halide with an organometallic compound, such as an aluminum trialkyl. The catalysts involving the use of transition metal oxides or the use of reaction products of transition metal halides and organometallic compounds, herein referred to as coordination catalysts, can furthermore be suitably used to prepare copolymers of ethylene and alpha-olefins, wherein the alpha-olefins are copolymerized with the ethylene to an extent of less than 25%. These copolymers have densities in the range of 0.91 to 0.95, yet differ substantially in their solid state properties from the homopolymer of ethylene of that density range.

Branched polyethylenes, i.e., those obtained by the Fawcett et al. process, linear polyethylene, and the copolymers of ethylene with alpha-olefins have significant melt flow above their crystalline melting points which allows their fabrication by a variety of methods in a host of applications. Although the solid state properties of these polymers differ significantly, the ease of fabrication or fabricability of these polymers is governed by similar structural characteristics and is measured by such properties as melt flow at low and high shear stresses, melt elasticity, melt strength and melt fracture. The usefulness of a particular resin for a particular method of fabrication is determined by these properties.

In the extrusion of film it is necessary to employ a polymer which has a higher melt flow at high shear stresses before melt fracture so that the polymer can be extruded at a rapid rate and simultaneously, a polymer is required that results in an extrudate which has good melt strength so that the extrudate can be drawn, which is necessary to improve the properties of the film.

In the extrusion of pipe it is necessary to employ a polymer which has a high melt flow at high shear stresses to obtain the high rates of production necessary for commercial operation, but it is also essential to employ a polymer which has a very low melt flow at low shear stresses so that the extrudate will not lose its shape before solidification. Here, too, it is also essential to avoid melt fracture and melt elasticity in the polymer, since such properties cause poor surfaces.

In the preparation of bottles it is necessary to employ a resin which will extrude rapidly and yet on extrusion can be formed or blown into the bottle. In order for the bottle to retain its shape and have acceptable surface properties it is necessary to employ a resin which has a low melt flow at low shear stresses and one which has low melt elasticity.

Thus, an ideal polymer is one which would have high melt flow at high shear stresses without melt fracture and very low melt flow at low shear stresses without melt elasticity. In general, however, as the average molecular weight is increased to obtain the necessary improvement in melt strength and low melt flow of the polymer at low shear stresses, the melt flow at high shear stresses is also decreased and melt fracture occurs at lower melt flows. Furthermore, as the average molecular weight is increased, the melt elasticity is increased. Thus it has heretofore not been possible to obtain a polymer which has a high melt flow or low apparent viscosity without melt fracture at high shear stresses and a very low melt flow at low shear stresses and also has high melt strength and low melt elasticity.

It is therefore the object of the present invention to provide a novel class of ethylene polymers and copolymers. It is a further object of the present invention to provide a novel class of ethylene polymers and copolymers which have outstanding melt properties. It is yet another object of the present invention to provide ethylene polymers and copolymers which have a combination of high melt flow without melt fracture at high shear stresses and low melt flow at low shear stresses and at the same time possess high melt strength and low melt elasticity. A further object is to provide a novel process for preparing the novel polymers of the present invention. Other objects will become apparent hereinafter.

The objects of the present invention are accomplished by a composition which is obtained by the molecular coupling of polymer molecules of the class consisting of ethylene homopolymers and ethylene/alphaolefin copolymers, containing from 0.1 to 25 weight percent of the alpha-olefin in the copolymer, said polymer molecules having a melt index of 0.2 to 20 and having ethylenic unsaturation of at least 0.5 per 2000 carbon atoms, with a free-radical initiator to a polymer having a melt index of 0.001 to 10. In accordance with the present invention it was discovered that the products obtained by two-step polymerization, i.e., the first polymerization to unsaturated polymers having a melt index in the range of 0.2 to 20 and the subsequent molecular coupling to products having melt indices in the range 0.001 to 10, give rise to products having melt properties which cannot be obtained by polymers which are directly synthesized to the melt index range of 0.001 to 10. The molecular coupling of the present invention is defined as the condensation of the saturated portion of one polymer molecule with the ethylenic double bond of a second molecule through a free-radical or a free-radical-forming compound. The coupling reaction is dependent on the existence of an ethylenic double bond which is essential for coupling and distinguishes the present process from crosslinking or curing processes as practiced in the art heretofore. In a preferred embodiment of the present invention, the product is an ethylene homopolymer or ethylene/alpha-olefin copolymer obtained by reacting an ethylene polymer or ethylene alpha-olefin copolymer having a degree of unsaturation of from 0.5 to 5 per 2000 carbon atoms and a melt index of 0.2 to 20 with from 10 parts to 1000 parts per million of a peroxygen compound. Although the peroxygen compounds are preferred, it is to be understood that other free-radical initiators capable of causing reaction at the double bond such as azo compounds and irradiation may be employed.

The reaction of polyethylene and related compositions with peroxides has been described in the literature and a number of patents, including U.S. 2,455,910, U.S. 2,628,-214, U.S. 2,448,946 and U.S. 2,826,570. The process has generally been referred to as a curing or cross-linking of the polymeric composition. In these processes a peroxide is incorporated into the polymer at lower temperatures than are required for the crosslinking to occur, the polymer is then fabricated into the desired shape and thereafter or simultaneously with the fabrication, heated to a temperature and for a period sufficient to crosslink. The resulting polymer has no melt flow and is insoluble in hydrocarbon solvents at elevated temperature. The polymer, furthermore, is greatly improved in stress-crack resistance. The process and product of the present invention is not to be confused with this type of curing and resulting product. The molecular coupled polymers of the present invention continue to have melt flow; they are not changed in their solid state properties, nor are they changed—and this is highly surprising—in their melt elasticity. The cross-linking of polyethylene is characterized by an increase in metl elasticity which results on the addition of small quantities of the curing agent. On addition of larger quantities of curing agent there is produced a polymer having no melt flow. The crosslinking of hydrocarbon polymers does not require the existence of the ethylenic double bond; however, the ethylenic double bond is necessary to obtain the molecular coupled products of the present invention. The addition of quantities of peroxide used in the process of the present invention, furthermore has not been contemplated in the plastics industry because it was believed that such compositions had neither the beneficial properties of a cured resin nor the melt fabricability of the uncured resin.

The products of the present invention are significantly different from cured polyethylenes known heretofore. The process of the present invention is not a curing process, but is a coupling of molecules. The actual mechanism of the molecular coupling as practiced in the present invention is not clearly understood. However, it was found necessary to employ coupling polymers having at least 0.5 ethylenic unsaturation for every 2000 carbon atoms in the polymer molecule. A preferred range of unsaturation in the polymeric molecule is from 0.5 to 5 per 2000 carbon atoms. Employing a polymer which contains less than the stated unsaturation does not give rise to the products of the present invention as illustrated hereinbelow. The unsaturation in the polymer is readily determined by the infrared scan of the polymer and may be trans, vinyl or vinylidene in nature.

Whether a particular branched or linear polyethylene or a copolymer of ethylene has sufficient unsaturation depends, of course, on the method of its production. In general, branched polyethylenes prepared by free-radical polymerization do not meet the unsaturation requirement necessary for the production of the compositions of the present invention. However, branched polyethylenes prepared in the presence of an ethylenically unsaturated telogen would meet the requirements. Linear polyethylenes and copolymers of ethylene with alpha-olefin generally possess the necessary unsaturation and, consequently, are useful in the present invention. However, under certain conditions, linear polyethylenes—particularly those prepared at low temperatures and pressures with a coordination catalyst—give rise to a polymer having insufficient unsaturation.

Furthermore, in order to obtain the maximum effect of the improved melt properties of the polymer, it is necessary to employ polymers having specific average molecular weights and couple these to polymers of specific average molecular weights. A convenient inverse relative measure of average molecular weight is melt index, which measures the quantity of polymer in grams flowing in 10 minutes through a specified orifice at a temperature of 190° C. under specified pressure. The method and apparatus used is described in greater detail in ASTM–1238–52T. The coupling polymer must have a melt index in the range of 0.2 to 20 and preferably between 1 and 10. At higher melt indices of the coupling polymer the improvement in melt properties is not realized. Although the melt index is decreased by the molecular coupling the solid state properties of the coupled product are essentially those of the starting material. Coupling polymers of melt index below 0.2 are not employed because the coupled product would have insufficient flow and, furthermore, polymeric monomers having an original melt index of less than 0.5 have an undesirable amount of melt elasticity already built in which, of course, is not decreased by the post-polymerization. In accordance with the present invention, the starting material is coupled to a polymer having a melt index in the range of 0.001 to 10. In general the optimum improvement in melt properties is obtained when the melt index is reduced by a factor of 5 to 100. A further reduction in melt index will lead to polymers which contain crosslinked areas in the form of insoluble, intractable gel particles, which destroy the homogeneity and uniformity of the polymer.

The method of carrying out the molecular coupling of the present invention is highly critical with respect to the addition of the peroxide to the polymer. It is essential that the peroxide be distributed throughout the polymer before a significant portion of the peroxide has reacted with the polymer. In the molecular coupling of the present invention, premature reaction of the peroxide is shown in the product by gel formation which is readily detected when the polymer is extruded into film. The avoidance of gel formation depends on a number of factors, but principally on the half-life of the peroxygen compound at the temperature at which the peroxygen compound is mixed with the polymer and the rate at which the peroxygen compound is distributed through the polymer. The molecular coupling is generally carried out at a temperature at which the polymer exists in the molten stage, i.e., from ~115° C. for branched polyethylenes and from ~130° C. for linear polyethylenes to 250° C. Higher temperatures are to be avoided because of the extremely short half-lives of the peroxygen compound and because of the increased rate of decomposition at those temperatures. The molecular coupling is continued until substantially all of the peroxygen compound has reacted with the polymer; a convenient time is six half-lives of the initiator employed. The peroxygen compound may be admixed with the polymer at a temperature where the peroxygen compound is relatively inactive and the polymer coupled at elevated temperatures or the peroxygen compound may be added to the polymer at molecular coupling temperatures. In either case it is essential that the peroxygen compound be evenly distributed before substantial reaction has occurred. When adding the peroxide at temperatures at which molecular coupling occurs, i.e., generally above the melting point, it is desirable to add the peroxygen compound in dilute form to the polymer in order to obtain even distribution of the peroxygen compound in the polymer prior to substantial reaction. Preferably dilute solutions or dispersions of the peroxygen compound in inert volatile media in which the polymer is soluble or with which the polymer in the molten stage is miscible are employed. The concentration of such solutions in general should not exceed 25%. A large variety of mixing and reaction vessels may be employed, such as rolling mills, Banbury mixers, and screw extruders. In view of the large variety of apparati, peroxygen compounds and reaction temperatures available, it is not possible to define the exact conditions under which the process is to be carried out; however, the successful operation of the process of the present invention depends on the avoidance of the formation of gel particles in the molten polymer. The presence or absence of such is readily determinable by the extrusion of the polymer into film. If gel particles are formed, the process employed should be modified in one or more of the following ways:

(1) Increase in mixing action;

(2) Lowering of reaction temperature;

(3) Reduction of the concentration in which the initiator is added; and (4) Use of peroxygen compound having a longer half-life.

The process of producing the compositions of the present invention is not limited to any particular type of peroxygen initiator. The suitability of the peroxygen initiator is determined by its reactivity at any particular temperature such as is measured by its half-life and the environment in which the molecular coupling is carried out. Suitable peroxygen initiators include inorganic peroxides, such as zinc peroxide, sodium persulfate; diacyl peroxides, such as benzoyl and lauroyl peroxides; dialkyl peroxides, such as diethyl peroxide, ditert.-butyl peroxide, diisopropyl peroxide; hydroperoxides, such as tert.-hydroperoxide; peracids, such as acetoperacid, benzoperacid, succinic monoperacid; peresters, such as ethyl perbenzoate, butyl perbenzoate; and diaralkyl peroxides, such as dibenzyl peroxide, dicumyl peroxide. Some of the suitable peroxygen compounds are listed hereinbelow with their half-lives, which also depend in some instances on the solvent employed.

| | |
|---|---|
| Ditert.-butyl peroxide | $t_{1/2}$=1 min. at 190° C. |
| Tert.-butyl hydroperoxide | $t_{1/2}$=1 min. at 230° C. |
| Isopropyl peroxydicarbonate in benzene | $t_{1/2}$=1 min. at 96° C. |
| Dichlorobenzoyl peroxide | $t_{1/2}$=1 min. at 112° C. |
| Lauroyl peroxide in benzene | $t_{1/2}$=1 min. at 123° C. |
| Acetyl peroxide in toluene | $t_{1/2}$=1 min. at 132° C. |
| Benzoyl peroxide in benzene | $t_{1/2}$=0.5 min. at 146° C. |
| Tert.-butyl peracetate | $t_{1/2}$=0.5 min. at 178° C. |
| Tert.-butyl perbenzoate in phenyl ether | $t_{1/2}$=0.5 min. at 188° C. |
| 1,1-bis(tert.-butylperoxy)-cyclohexane in butyl acetate. | $t_{1/2}$=0.5 min. at 158° C. |
| 2,2-bis(tert.-butylperoxy)-1-phenylpropane in butyl acetate. | $t_{1/2}$=1 min. at 160° C. |
| 2,2-bis(tert.-butylperoxy)-propane in phenyl ether. | $t_{1/2}$=1 min. at 164° C. |
| Di-α-cumyl peroxide in dodecane | $t_{1/2}$=1 min. at 190° C. |
| Diethyl peroxide | $t_{1/2}$=1 min. at 198° C. |
| Ditert.-amyl peroxide | $t_{1/2}$=1 min. at 182° C. |
| Cyclohexyl hydroperoxide | $t_{1/2}$=0.5 min. at 226° C. |

In addition to peroxides, azonitriles may also equally be employed as initiators in the molecular coupling of the present invention. Suitable azonitriles and their half-lives are:

| | |
|---|---|
| α,α′-azobis(α,γ,γ trimethylvaleronitrile) | $t_{1/2}$=2 min. @ 91° C. |
| α,α′-azobis(α-cyclopropyl propionitrile) | $t_{1/2}$=1 min. @ 118° C. |
| dimethyl α,α′-azodiisobutyrate | $t_{1/2}$=2 min. at 138° C. |
| α,α′-azodiisobutyronitrile | $t_{1/2}$=2 min. at 132° C. |
| azodicyclohexane carbonitrile | $t_{1/2}$=2 min. at 166° C. |
| β-hydroxyethylazo-α,γ-dimethyl-valeronitrile | $t_{1/2}$=2 min. at 182° C. |

A particularly preferred method of carrying out the molecular coupling of the present invention comprises the molecular coupling in a melt extruder containing a polymer mixing section in which the temperature is maintained at 150° to 250° C. The initiator is injected into the extruder barrel as a dilute solution or dispersion of the initiator in a solvent such as hexane, benzene, or a low molecular weight polyethylene wax. The advantages of using an extruder are the ready temperature control, the control of hold-up time by controlling the die opening and screw design and the mixing action which is readily controlled by screw speed. The use of the screw extruder furthermore permits the molecular coupling to be carried out continuously.

The process of the present invention is further illustrated by the following examples:

EXAMPLE I

Onto a 2 inch 2-roll mill maintained at a temperature of 130° C. was fed 50 g. of polymer. After the polymer had attained the temperature of the mill the quantity of dicumyl peroxide indicated below was incorporated and milling was continued for a period of 5 minutes. The polymer was then removed from the mill and the mill was heated up to 200° C. The polymer was then milled at that temperature for an additional 5 minutes. The following results were obtained.

*Table I*

| Polymer | Comonomer | Concentration of Comonomer, wt. percent | Amount of Ethylenic Unsaturation in 2000 C atoms | Melt Index of Polymer | Quantity of Dicumyl Peroxide in p.p.m. | Melt Index of Coupled Polymer |
|---|---|---|---|---|---|---|
| Polyethylene A | | | 1.8 | 3.5 | 500 | 0.5 |
| Do | | | 1.8 | 3.5 | 1,000 | 0.006 |
| Polyethylene B | | | 1.25 | 2.5 | 1,000 | 0.38 |
| Polyethylene C | | | 3.5 | 3.72 | 500 | 0.43 |
| Polyethylene D | | | <0.25 | 3 | 1,000 | 3.5 |
| Do | | | 0.25 | 3 | 2,000 | 2.8 |
| Do | | | 0.25 | 3 | 3,000 | 1.3 |
| Do | | | 0.25 | 3 | 4,000 | 0.7 |
| Copolymer A | decene | 2 | 1.9 | 2.9 | 750 | 0.46 |
| Copolymer B | do | 2 | 1.9 | 3.0 | 1,000 | 0.7 |

The polyethylenes and copolymers employed in Table I were obtained as follows:

Polyethylene A: Prepared by the procedure disclosed in British Patent No. 783,487.

Polyethylene B: Commercially available as "Hifax" 1400E.

Polyethylene C: Commercially available as "Marlex" 50.

Polyethylene D: Commercially available at "Alathon" 34.

Copolymer A and B: Prepared by the process of British Patent No. 783,487.

Table I shows that polyethylenes having insufficient ethylenic unsaturation are not significantly changed in their behavior on the addition of the quantities of initiator employed in the process of the present invention. The table further shows that molecular coupling is obtained with polyethylene prepared by different methods as well as with copolymers of ethylene.

EXAMPLE II

The polymers employed in the present example were coupled in a 2-inch Royle extruder having an overall screw length of 40 inches. The back of the barrel was maintained at 140° C., temperature increasing to 225° to 240° C. at the die head of the extruder. The polymer was extruded through a two-hole 3/16 inch die and resulted in 1/8 inch beading which was cut up into small cylinders and used for further fabrication and testing as indicated. The initiator, tert.-butyl hydroperoxide, was injected through a probe at the mid-point of the barrel as a solution in benzene varying in concentration from 4 to 12% as indicated, and in the quantities also indicated in Table II. This table shows in comparison the solid state properties and the rheological properties of the untreated resin (Classification 1), the coupled resin (Classification 2), and the properties of a resin directly synthesized to the molecular weight obtained on molecular coupling (Classification 3). The additional polymer identification corresponds to the identification employed in Example I.

Furthermore, the attached drawing, FIGURE 1, shows the change in apparent viscosity with increasing apparent shear stress for the untreated resin, polyethylene A–1, for the coupled resin, polyethylene A–2, and for the resin, polyethylene A–3, which was directly polymerized to the melt index of the coupled resin. The data for the graphs were obtained by extruding the compositions at a temperature of 190° C. through a series of capillaries having a length to diameter ratio of 16 to 1 and diameters of 0.005 in. to 0.0465 in. The apparent shear stress was determined by the following equation.

$$\text{shear stress} = S = \frac{P}{4L/d} \text{ in dynes/cm.}^2$$

where L and $d$ are the length and diameter of the die and P is the pressure developed in pushing the polymer through the orifice. The apparent viscosity is determined by the following equation:

$$\text{Apparent viscosity} = Z = \frac{S}{Q} \text{ in poises}$$

where S is as above and Q is the apparent shear rate determined by the following equation:

$$Q = \frac{32 \times q}{\pi d^3} \text{ in sec}^{-1}$$

where $d$ is as above and $q$ is the flow of the melt out of the orifice in the same volumetric units as $d^3$.

*Table II*

| Polymer | Molecular Coupling | | Melt Index, ASTM–D–1238–52–T, g./10 min. | Solid State Properties | | | | | Rheoligical Properties | | |
|---|---|---|---|---|---|---|---|---|---|---|---|
| | Initiator, percent in Benzene | Concentration, p.p.m., of pol. | | Density (Annealed), g./ml. | Stiffness (ASTM–D–747) in p.s.i. | Ultimate Strength (ASTM–D–412)@ 2″/min. in p.s.i. | Elmendorf Tear Strength, g./mil. | Environmental Stress Crack/hours | Swell in Mils | Stress Exponent "$n$" | Melt Tension |
| Polyethylene A–1 | ---------- | ---------- | 3.46 | 0.956 | $93.1\times10^3$ | 4,080 | 61 | 5 | 115 | 1.40 | 0.4 |
| Polyethylene A–2 | 10 | 300 | 0.46 | 0.956 | $96.9\times10^3$ | 4,180 | 72 | 7 | 117 | 1.89 | 3.8 |
| Polyethylene A–3 | ---------- | ---------- | 0.42 | 0.952 | $94\times10^3$ | 4,970 | 90 | 20 | 124 | 1.36 | 2.5 |
| Eth.-Copolymer A–1 (2.0% decene) | ---------- | ---------- | 2.86 | 0.948 | $86.6\times10^3$ | 4,100 | 71 | 3.5 | ---------- | 1.40 | 0.4 |
| Eth.-Copolymer A–2 (2.0% decene) | 10 | 850 | 0.43 | 0.949 | $91.4\times10^3$ | 4,010 | 71 | 4.5 | ---------- | 1.84 | 4.6 |
| Eth.-Copolymer A–3 (2.0% decene) | ---------- | ---------- | 0.53 | 0.944 | $72.6\times10^3$ | 4,320 | 93 | →1,000 | ---------- | 1.42 | 1.5 |
| Polyethylene D–1 | ---------- | ---------- | 2.87 | 0.930 | $42.7\times10^3$ | 1,750 | 74 | ←1 | 112 | 1.58 | 1.1 |
| Polyethylene D–2 | 10 | 5,000 | 0.67 | 0.930 | $41.5\times10^3$ | 1,760 | 74 | ←1 | 140 | 1.72 | 1.0 |
| Polyethylene D–3 | ---------- | ---------- | 0.59 | 0.929 | $43.5\times10^3$ | 2,500 | 82 | ←1 | 132 | 1.69 | 6.1 |
| Polyethylene C–1 | ---------- | ---------- | 3.72 | 0.963 | $132\times10^3$ | 4,038 | 54 | ---------- | 121 | 1.63 | 0.7 |
| Polyethylene C–2 | 10 | 350 | 0.43 | ---------- | ---------- | 4,249 | 55.9 | ---------- | 125 | 1.99 | 6.7 |
| Polyethylene C–3 | ---------- | ---------- | 0.90 | 0.959 | $116\times10^3$ | 3,836 | 81.4 | ---------- | 108 | 1.63 | 1.8 |

The graphs show that the coupled resins of the present invention have substantially the same apparent viscosities and thus the same melt-flow as the untreated resins at high apparent shear stresses and yet at low shear stresses have higher apparent viscosities or lower melt flow than the polymer directly polymerized to the same melt index.

The data presented in Table II show that the coupled polymers of the present invention have solid state properties which are substantially the same as the base resin from which the coupled polymer is prepared. Comparison with a resin directly polymerized to substantially the same melt index and therefore substantially the same average molecular weight indicates that the novel, coupled resins differ in some of the solid state properties from the directly-polymerized resins, particularly in their environmental stress-crack properties. This is one demonstration that the resins obtained by molecular coupling differ in their structure from resins directly synthesized to the same melt index. The solid state properties listed are density, which is measured on a molded sample 60 mils thick, molded at 180° C., cooled in the press and then annealed at 100° C. for one hour; stiffness, a measurement of Young's modulus obtained by ASTM–D–747; ultimate strength, the tensile strength of the sample at its breaking point measured at a drawing rate of 2″ per minute in accordance with ASTM–D–412; Elmendorf tear strength, measuring the tear resistance of a 10 mil compression molded film in accordance with ASTM–D–689–44; and environmental stress cracking which measures toughness and endurance of a sample bent 180° in a detergent at 50° C. as described in the book of R. A. V. Raff and J. B. Allison entitled "Polyethylene," Interscience Publishers, 1956, pp. 389–393.

The data further show the substantial melt property changes occurring in the novel, coupled polymer as compared to the base resin or the resin synthesized directly to the same melt index. The listed properties are "swell," which is a measure of melt elasticity and is obtained by measuring the diameter in mils of the melt index extrudate obtained by ASTM–D–1238–52–T the orifice having a diameter of 82 mils; melt tension which is a measure of the strength of the polymer melt and is obtained by measuring the tension necessary to draw a circular filament extruded at 0.252 gms.—min. from 83 to 21 mils at 225° C.; and stress exponent "$n$" which is a measure of the slope of the log shear rate—long shear stress curve obtained by measuring the melt index at 2160 g. and 6480 g. loading. Measurement of "$n$" was found to be an excellent measure of the processability of a resin. A large "$n$" indicates that the polymer of a given melt index flows well at high pressure, but only moderately at low pressures. This is highly desirable since high flow rates are essential in extrusion and injection molding where relatively high pressures are employed and are undesirable in such operations as vacuum-forming and bottle-molding, where it is desirable to have the polymer flow as small as possible in order to retain its shape. The rheological data in Table II show that the coupled resins are greatly improved in fabricability as compared to both the base resin and the directly-synthesized resin. The table further shows that the melt tension of the polymer, measuring the strength of the polymer melt, is increased, but that contrary to the heretofore-expected as indicated by low swell results, the melt elasticity is not significantly increased. In the treated polyethylene resin which does not have the required degree of unsaturation, it will be noted that although melt strength is increased, the processability of the polymer is not significantly increased, but that the melt elasticity as measured by swell is greatly increased. It was furthermore found that the resin not having the necessary degree of unsaturation, on being subjected to the coupling treatment, will give rise to polymers which are similar to polymers obtained on direct polymerization to the same melt index and thus quite contrary to the polymers having the necessary degree of unsaturation.

EXAMPLE III

The polyethylenes A-1, A-2 and A-3 and coplymers A-1, A-2 and A-3 were injection molded on a 12-ounce Watson-Stillman injection molding machine, with a 6-ounce cylinder (#6B), a polyliner spreader (#B), gage nozzle (#N) having a 1/8" orifice and a 4" x 6" x 0.125" plate mold. Table III demonstrates the injection molding conditions and the pressures necessary to obtain filling of the mold. This table shows the results obtained in a practical application of the coupled polymers of the present invention in comparison with the base resin and with the resin directly synthesized to the melt index of the coupled polymer. As can be seen from the table, the coupled polymer, although having a melt index lower by an order of a magnitude than the base resin, can be injection-molded at approximately the same conditions as the base resin, whereas the polymer directly synthesized to the lower melt index requires conditions which are approximately increased 50% in both time and pressure to achieve the same moldings.

*Table III*

| Polymer | Melt Index | Molding Conditions | | | | |
|---|---|---|---|---|---|---|
| | | Cylinder Temp., ° C. | Mold Temp., ° C. | Injection Cycle (sec.) | Cooling Cycle (sec.) | Ram Pressure (p.s.i.) |
| Polyethylene A-1 | 3.46 | 180-210 | 60 | 20 | 20 | 9,150 |
| Polyethylene A-2 | 0.46 | 180-210 | 60 | 20 | 20 | 10,100 |
| Polyethylene A-3 | 0.42 | 180-210 | 60 | 30 | 30 | 15,200 |
| Copolymer A-1 | 2.86 | 180-210 | 60 | 20 | 20 | 9,170 |
| Copolymer A-2 | 0.43 | 180-210 | 60 | 20 | 20 | 10,700 |
| Copolymer A-3 | 0.53 | 180-210 | 60 | 30 | 30 | 15,200 |

EXAMPLE IV

The polyethylenes A-1, A-2, A-3 and an untreated polyethylene having a melt index of 1.5 were extruded as tubing employing a 0.5 in. die with a 0.25 in. mandrel in the die opening. The extruder employed was a 2.5 in. "Prodex" extruder having a screw length of 60 in. The extruder and the die were maintained at a temperature of 205° C. and the polymer was extruded at a constant rate of 12 lbs./hr. Table IV shows the performance of the various polymers employed in the example. The pressure developed in the constant rate extrusion was measured and is listed in the table. The length of the tubing after 2 seconds and 18 seconds of extrusion was measured. From the length of the tubing after 2 seconds, a theoretical tube length was established and the polymer drool was calculated by the following equation:

$$\text{Drool}=\left(\frac{\text{Actual length of tubing after 18 sec.}}{\text{Theoretical length of tubing}}\right)-1$$

*Table IV*

| Polymer | Melt Index | Pressure Developed (p.s.i.) | Length of Tubing (in.) | | Polymer Drool |
|---|---|---|---|---|---|
| | | | 5 second Extrusion | 18 second Extrusion | |
| Polyethylene A-1 | 3.5 | 330 | 2.0 | 11.4 | 0.46 |
| Do | 1.5 | 550 | 2.0 | 9.0 | 0.25 |
| Polyethylene A-2 | 0.4 | 550 | 2.0 | 7.6 | 0.08 |
| Polyethylene A-3 | 0.5 | 800 | 2.0 | 7.2 | 0.00 |

The data in Table IV show that the coupled resin of the present invention can be extruded at a substantially lower melt pressure and consequently with substantially lower power or at higher rates than polymer polymerized to the same melt index. On the other hand, the drooling of the tube is negligible for both the coupled and directly synthesized low melt index polymers but significantly higher for the high melt index polymers.

EXAMPLE V

A linear polyethylene having a density of 0.958 g./cm.$^3$, a stiffness of 84000 p.s.i. as measured by ASTM-D-747, and a melt index of 6.7 was subjected to $3\times10^6$ R.E.P. (Roentgen equivalent physical) irradiation from a van der Graaff generator. The van der Graaff generator was operated at 2.0 million electron volts and 250 milliamperes; the sample was passed at a rate of 2 cm. per second at a distance of 10 cm. from the irradiation window. The resulting polymer was found to have a melt index of 0.66 and a density of 0.955 g./cm.$^3$. The polymer so obtained was injection molded in a Watson-Stillman 12-ounce injection molding machine at a temperature of 225° C. under a pressure of 9000 p.s.i. into a spiral flow mold maintained at 50° C. The length of the spiral obtained was determined and is a measure of the moldability of the resin. Two linear polyethylenes having melt indices of 6.7, i.e., the untreated resin, and 0.66, which was obtained by direct polymerization, were compared to the resin directly obtained. It was found that the coupled polyethylene had a spiral melt flow of 20.8 in., the base resin a melt flow of 17.8 in. and the polyethylene directly synthesized to the melt index of the coupled polyethylene a spiral melt flow of 11.7 in. Thus, the polyethylene obtained was improved in melt flow over both the untreated resin and the resin directly synthesized to the melt index of the coupled resin.

The examples have demonstrated the principle of the present invention, and have shown the critical features both with respect to the quantity of initiator and the type of polymer used. Similarly, copolymers of ethylene and other alpha-olefins, particularly alpha-olefins having from 3 to 18 carbon atoms, such as propylene, butene-1, pentene-1, hexene-1, isobutylethylene, octene-1, nonene-1, and dodecene-1, may be employed in the process of the present invention. Various modifications of the process will occur to those skilled in the art. The examples have illustrated the process of the present invention and are not to be construed as limiting the invention.

The greatly-surprising feature of the coupled polymers of the present invention is their rheological behavior which determines the processability and therefore to a large part the utility of a resin. Apparent viscosity is one of the major rheological properties which determine the processability of a resin, a high apparent viscosity being desirable in vacuum-forming, blow-molding and compression-molding, and a low apparent viscosity being desirable in melt extrusion and injection molding. In general, the apparent viscosity of a polymer melt will decrease with increasing shear stresses and will also decrease as the average molecular weight of the polymer is decreased. However, the compositions of the present invention do not follow the normal change of apparent viscosity with change in shear stress and have higher-than-normal apparent viscosities at high shear stresses and lower-than-normal apparent viscosities at low shear stresses, thus combining the advantageous rheological properties of two heretofore only separately-prepared resins in one resin without the disadvantageous rheological properties of the two individual resins. The rheological properties of the coupled polymer are such that they have at the high shear stresses the apparent viscosities of the base resin from which they are prepared and therefore the apparent viscosities of a resin having a melt index of an order of magnitude larger than the coupled polymer and simultaneously at low shear stresses have apparent viscosities which are higher than those of a resin directly synthesized to the melt index of the coupled polymer without the deleterious effect of melt elasticity found in the directly-synthesized resins.

The compositions of the present invention are prepared by molecular coupling of polymeric molecules which contain ethylenic unsaturation through which the molecular coupling takes place. This distinguishes the process of the present invention from the random crosslinking which occurs when a peroxide is added to a saturated hydrocarbon polymer. The process of the present invention is characterized by the large change in melt index with exceedingly small quantities of initiator, which does not occur in saturated hydrocarbon polymers when crosslinked with peroxides. However, although a significant change in melt index occurs through molecular coupling, the products of the present invention must be considered linear polymers in distinction from crosslinked polymers, since they can be fabricated by methods suitable only for linear polymers. The sensitivity of the process of the present invention to the quantity of initiator employed as compared to the insensitivity of the quantity of crosslinking agent employed in the curing of polymers leads to the conclusion that the process of the present invention results in novel polymeric products which differ in molecular structure from polymers heretofore prepared.

The unique rheological behavior renders the polymers of the present invention suitable for a large number of applications, such as extrusion into packaging film, extrusion onto wire for insulation, molding of shaped forms, extrusion of fibers, and coating of paper. The polymers are uniquely suitable for applications which involve a two-step process involving low and high shear stresses such as the extrusion of sheeting which is subsequently vacuum-formed, or extrusion of tubing which is blown into bottles.

We claim:

1. The process which comprises coupling molecules of a polymer of the class consisting of polyethylenes having a density of 0.94 to 0.97 g./cc. and ethylene/aliphatic alpha-olefin copolymers containing from 0.1 to 25 weight percent of said alpha-olefin, and wherein the said alpha-olefin has from 3 to 18 carbon atoms, said polymer molecules having a melt index of 0.2 to 20 and an ethylenic unsaturation of at least 1.25 per 2000 carbon atoms with from 10 to 1000 parts per million of a peroxide at a temperature above the melting point of the polymer and thereby decreasing the melt index of the polymer at least one- half to a polymer having a melt index of 0.001 to 10.

2. The process set forth in claim 1 wherein the polymer to be coupled is a polyethylene.

3. A process as set forth in claim 1 wherein the peroxide is an organic peroxide.

4. A process as set forth in claim 1 wherein the peroxide is a dialkyl peroxide.

5. A process as set forth in claim 1 wherein the peroxide is an alkyl hydroperoxide.

6. A process as set forth in claim 1 wherein the peroxide is a diaryl peroxide.

7. A process as set forth in claim 1 wherein the peroxide is an aryl hydroperoxide.

References Cited in the file of this patent

UNITED STATES PATENTS

| | | |
|---|---|---|
| 2,628,214 | Pinkney | Feb. 10, 1953 |
| 2,826,570 | Ivett | Mar. 11, 1958 |
| 2,839,515 | Davison et al. | June 17, 1958 |
| 2,862,917 | Anderson et al. | Dec. 2, 1958 |
| 2,888,424 | Precopio et al. | May 26, 1959 |
| 2,938,012 | Filar | May 24, 1960 |

OTHER REFERENCES

"Polythene" (Renfrew and Morgan), published by Iliffe and Sons (London), 1957 (page 83 relied on).

UNITED STATES PATENT OFFICE

CERTIFICATION OF CORRECTION

Patent No. 2,993,882 July 25, 1961

Clarence Elmer Ashby et al.

It is hereby certified that error appears in the above numbered patent requiring correction and that the said Letters Patent should read as corrected below.

Column 3, line 40, for "metl" read -- melt --; column 5, line 39, after "tert.-" insert -- butyl --; column 6, line 62, for "temperature" read -- temperatures --; column 7, lines 14 to 16, for that portion of the equation reading P
4L/d read $$\frac{P}{4L/d}$$

column 8, line 22, for "gms.—min." read -- gms./min. --; line 24, for "long" read -- log --.

Signed and sealed this 12th day of December 1961.

(SEAL)
Attest:

ERNEST W. SWIDER
Attesting Officer

DAVID L. LADD
Commissioner of Patents